United States Patent [19]
Davis

[11] Patent Number: 4,741,516
[45] Date of Patent: May 3, 1988

[54] FLUID SUSPENSION SPRING AND DAMPER FOR VEHICLE SUSPENSION SYSTEM

[75] Inventor: Leo W. Davis, Dallas, Tex.

[73] Assignee: LiquidSpring Investors, Ltd., Dallas, Tex.

[21] Appl. No.: 941,289

[22] Filed: Dec. 12, 1986

Related U.S. Application Data

[63] Continuation-in-part of Ser. No. 907,140, Sep. 12, 1986, Pat. No. 4,735,402, which is a continuation of Ser. No. 753,365, Jul. 5, 1985, abandoned, which is a continuation of Ser. No. 550,883, Nov. 9, 1983, abandoned, and a continuation of Ser. No. 625,452, Jun. 28, 1984, Pat. No. 4,652,008.

[51] Int. Cl.$^4$ .......................... F16F 5/00; B60G 11/26
[52] U.S. Cl. .................................. 267/64.13; 188/312; 267/217; 280/709
[58] Field of Search ............... 188/312, 313, 299, 319, 188/311, 322.14, 284, 288, 268, 316, 317, 322.22, 322.19, 322.16; 267/8 R, 64.11, 64.13, 64.15, 64.28, 217, 256; 280/672, 708, 702, 709, 711; 277/187; 138/31

[56] References Cited

U.S. PATENT DOCUMENTS

| | | | |
|---|---|---|---|
| 2,071,701 | 2/1937 | Mejean | 267/64.13 X |
| 2,197,474 | 4/1940 | Johnson | 267/64.15 |
| 2,225,986 | 12/1940 | Glezen | 188/314 |
| 2,410,716 | 11/1946 | Cook | 188/269 |
| 2,576,658 | 11/1951 | Werner | 188/274 |
| 2,785,774 | 3/1957 | Long et al. | 188/274 |
| 3,146,862 | 9/1964 | Van Winsen | 188/317 X |
| 3,186,702 | 6/1965 | Taylor | 267/64.13 |
| 3,190,400 | 6/1965 | Schultze | 188/314 |
| 3,204,945 | 9/1965 | Taylor | 267/64 |
| 3,303,856 | 2/1967 | Taylor | 138/31 |
| 3,361,422 | 1/1968 | Theuleau | 188/281 |
| 3,483,952 | 12/1969 | Cardwell | 188/312 X |
| 3,618,928 | 11/1971 | Taylor | 267/124 |
| 3,726,368 | 4/1973 | Taylor | 188/316 |
| 3,794,309 | 2/1974 | Chrokey et al. | 267/34 |
| 3,874,486 | 4/1975 | Katsumori et al. | 188/314 |
| 3,876,044 | 4/1975 | Kendall et al. | 188/282 |
| 3,937,450 | 2/1976 | Bauer | 267/113 |

(List continued on next page.)

FOREIGN PATENT DOCUMENTS

| | | | |
|---|---|---|---|
| 610938 | 12/1960 | Canada . | |
| 654141 | 12/1962 | Canada . | |
| 739014 | 8/1943 | Fed. Rep. of Germany | 188/282 |
| 2310614 | 9/1974 | Fed. Rep. of Germany . | |
| 0144808 | 11/1980 | Fed. Rep. of Germany | 188/312 |
| 7923126 | 4/1980 | France . | |
| 58-191341 | 11/1983 | Japan . | |
| 949,426 | 2/1964 | United Kingdom . | |

OTHER PUBLICATIONS

"Active suspension wins big-league adherents", by David Scott, *Automotive Engineering*, Sep. 1986.

*Primary Examiner*—George E. A. Halvosa
*Assistant Examiner*—Robert J. Oberleitner
*Attorney, Agent, or Firm*—Hubbard, Thurman, Turner & Tucker

[57] ABSTRACT

A vehicle with a suspension system having a compressible liquid confined in a cylinder and compressed to a predetermined static pressure. A damping piston is disposed on a double ended rod where the rod ends have different cross sectional areas to provide a differential area which is acted on by the liquid to spring support the weight of the vehicle. The end of the larger rod is connected to the vehicle chassis and bearings in each end of the cylinder transfer high bending moments due to wheel loads. Friction is reduced by eliminating contact between the large diameter piston and cylinder, and limiting frictional contact to the relatively small diameter of the bearings and seals. Total fluid volume is increased to provide a lower spring rate by a fluid chamber within the rod, and an apparatus is provided to control ride height by changes in liquid pressure and/or volume which also changes spring rate. An apparatus is also provided for adjusting damping and thus effective spring rate from the fixed end of the rod.

24 Claims, 3 Drawing Sheets

U.S. PATENT DOCUMENTS

| | | | |
|---|---|---|---|
| 3,958,673 | 5/1976 | Allinquant et al. | 188/315 |
| 3,986,862 | 7/1976 | Gorges et al. | 188/282 |
| 4,079,923 | 3/1978 | Kirchner | 280/705 |
| 4,099,602 | 7/1978 | Kourbetsos | 188/312 X |
| 4,212,087 | 7/1980 | Mortensen | 188/313 X |
| 4,265,344 | 5/1981 | Taylor | 188/322.5 |
| 4,428,566 | 1/1984 | de Baan | 267/64.15 |
| 4,474,271 | 10/1984 | Molders et al. | 188/280 |
| 4,502,673 | 3/1985 | Clark | 267/64.24 |
| 4,535,876 | 8/1985 | Taylor | 188/311 |
| 4,585,099 | 4/1986 | Taylor | 188/322.19 |
| 4,611,794 | 9/1986 | Taylor | 267/64.13 |
| 4,630,805 | 12/1986 | Taylor | 267/64.13 |
| 4,638,895 | 1/1987 | Taylor et al. | 188/312 |
| 4,671,392 | 6/1987 | Wossner | 188/322.22 |

FLUID SUSPENSION SPRING AND DAMPER FOR VEHICLE SUSPENSION SYSTEM

This application is a continuation-in-part of application Ser. No. 907,140 filed Sept. 12, 1986, now U.S. Pat. No. 4,735,402, which is a continuation of Ser. No. 753,365 filed Jul. 5, 1985 now abandoned which in turn is continuation of application Ser. No. 550,883 filed Nov. 9, 1983 now abandoned and a continuation-in-part of application Ser. No. 625,452 filed Jun. 28, 1984, now U.S. Pat. No. 4,652,008.

TECHNICAL FIELD

The technical field to which the invention relates comprises the art of vehicle suspension systems for absorbing road shock in the course of travel.

BACKGROUND OF THE INVENTION

In the art of vehicle suspension systems there have been several developments directed to improving the isolation of the vehicle frame from stresses and excursions of the vehicle resulting from uneven or rough roadway conditions and other factors inducing vibration in the vehicle undercarriage. Hydraulic, and/or combination pneumatic and hydraulic suspension systems are desirable for several reasons including improved fatigue life of the mechanism, vibration damping characteristics, reduction of peak force transmission and the contribution of the mechanism to flexibility and the design of vehicle undercarriage and frame. However, prior art hydraulic suspension spring and vibration damper mechanisms have disadvantages which have presented certain problems detracting from their ability to fulfill the suspension needs frequently sought by the owner or operator of the vehicle.

For many years, the suspension system most commonly utilized on roadway type vehicles such as passenger cars has been comprised of the combination of a coil spring and shock absorber at the front wheels and a coil spring or leaf spring and shock absorber at the rear wheels. Operating characteristics of each were typically selected by the automobile manufacturer for the average anticipated loads to be encountered and/or the ride comfort level sought to be maintained. By far, the majority of such systems lack any form of on-site adjustment to accommodate variances between actual load requirements and/or preferred comfort levels other than that originally provided by the manufacturer. Where increased loading was to be encountered subsequently, the suspension components were either replaced with others having increased load capacity or external members were applied to the individual spring units whereby to somehow limit, control or cushion their stroke. Some shock absorber units have included pneumatic adjustment features for loading compensation, leveling or both.

Shock absorbers are generally constructed of three basic designs. The conventional double tube hydraulic shock absorber has an outer reserve tube of hydraulic fluid and air surrounding its inner working chamber. The reserve fluid is used to compensate for changes in volume that occur in the pressure tube as a result of piston rod movement. The single tube gas pressurized or de-carbon shock has a separate pressure chamber containing nitrogen gas at about 400 psi in line beneath the working chamber. The two chambers are separated by a floating piston which moves up and down to balance the pressure of the gas below and the oil above as the volume of the working chamber changes with piston rod travel. The double tube gas shock absorbers have an outer reserve tube like conventional shocks, however, the hydraulic fluid is charged with low pressure gas. When the shock extends, the fluid has a positive pressure preventing cavitation under most circumstances while keeping the damping valving free of foam so as to effect a more consistent damping.

With the advent of the smaller autos many of which have front wheel drives, lesser space than before was available for installing the suspension system and for which the McPherson strut has been largely adopted by the automobile manufacturers. The McPherson strut essentially comprises a combination of the previous functions of the separate spring and shock absorber. At least some of such struts include the feature of damping adjustment operable by opening and closing of orifice means to control the flow rate of the damping fluid during excursions of bounce and rebound. Load capacity has substantially been preset such that the steel spring rate is maintained constant without affording any adjustment capability.

Clearly lacking in such suspension systems of the prior art is the ability to vary the spring rate individually by wheel via an on-site adjustment to more specifically meet the desired or changed suspension requirements to be sustained by the vehicle. Different individuals purchasing the same model vehicle may indeed have different preferences for the response characteristics of the suspension system. While most will be satisfied with the system provided by the manufacturer, at least some will prefer or require substantially different suspension characteristics from that originally provided with the vehicle at the time of manufacture. By way of examples, the elderly frequently prefer a softer more comfortable ride whereas the young may prefer the harder ride for racing or whatever. Buses or tractor-trailers for example may also prefer one characteristic over another depending on the type of cargo, cargo weight to be transported and/or degree of comfort to be afforded. The type of terrain or road conditions may to a large extent dictate or at least influence the desired suspension characteristics. The virtue of having the flexibility and versatility of custom tailoring the properties of the vehicle suspension system have therefore been known but despite recognition thereof an economically satisfactory solution therefor has heretofore been unknown.

SUMMARY OF THE INVENTION

The invention relates to a vehicle suspension system. More specifically, the invention relates to an improved suspension system for vehicles affording the versatility of enabling the spring rate of the suspension system to be adjusted individually at each wheel for custom matching the operational characteristics of the suspension system to a preferential performance for the vehicle.

In accordance with one important aspect of the present invention, there is provided a suspension strut effecting the combination of a spring and shock comprising a tubular housing and a double faced damper piston within the housing integrally part of an elongated stepped diameter piston shaft extending to outward of the housing. The housing is filled with a compressible fluid, preferably comprising a silicon composition having a suitable compressibility factor and compressed to a predetermined static value of pre-charge pressure.

The strut per se is comprised of an elongated tubular cylinder adapted to be mounted between the wheel support and the underframe or carriage of the vehicle. Contained within each cylinder is a fluid cavity of controlled volume defined in the spacing between two spaced apart glands, comprising an upper gland and a lower gland above and below the damping piston respectively. From within the cavity the damper piston is dual supported by the stepped diameter shaft/piston extending integrally from the upper and lower faces of the damper piston through the upper and lower glands. The shaft/piston provides both reciprocal bearing support for the shaft ends and a liquid seal for the cavity. A differential cross-sectional area defined between the upper and lower shaft portions enables a response of relative differential force between the bounce and rebound in the course of cylinder excursion. Damping is achieved by parallel flow orifices defined about the damper piston. By virtue of the double ended support of the shaft/piston, a bearing load on the piston is per se avoided.

When load changes occur, the balance of forces on the bounce and rebound sides go into imbalance with one side compressing while the other expands instantaneously. As the pressure differential is incurred, strut excursion is effected before damping flow is initiated. The result of this relationship is to afford a quicker rate of compliance than previously available. Incident thereto, the potential energy build-up in the tires and unsuspended components is reduced enabling faster vehicle travel velocities without loss of vehicle control while reducing the peak transmitted force to the various unsuspended components. As a consequence, a lesser peak impact force is generated resulting in the need for less energy to be dissipated.

In accordance with another important aspect of the present invention, strut adjustment means is provided that is readily accessible from the underside of the vehicle on which the strut is installed. By means of presetting the adjustment. the active post-installation volume of the fluid cavity can be reduced or increased to suit whereby to increase or decrease the precharge pressure imposed on the compressible fluid within the cavity. The effect of the changing volume of the pre-filled cavity is to impose an inversely correlated change on the spring rate properties of the fluid and in turn on the operating suspension characteristics of the suspension system.

In a still further important aspect of the invention, a control bleed path comprising a parallel division of the damping orifice is provided between the opposite surfaces of the piston for controlling the dynamic pressure and damping associated with excursions of the housing. As an optional feature, the flow area of the parallel damping orifice can be selectively varied to change the damping characteristics of the system.

In a still further aspect of the invention, there is provided a novel seal construction in the gland areas about the individual shaft ends in which the glands provide a controlled spread apart support of the bearing load while the seals prevent loss of fluid despite the magnitude of differential dynamic fluid pressures being imposed thereat.

The above noted features and advantages of the invention as well as other superior aspects thereof will be further appreciated by those skilled in the art upon reading the detailed description which follows in conjunction with the drawings.

DESCRIPTION OF THE PREFERRED EMBODIMENT

In the description which follows like parts are marked throughout the specification and drawings with the same reference numerals respectively. The drawing figures are not necessarily to scale and in certain views parts may be drawn rotated into the plane of the drawing for purposes of clarity.

Figure 1:
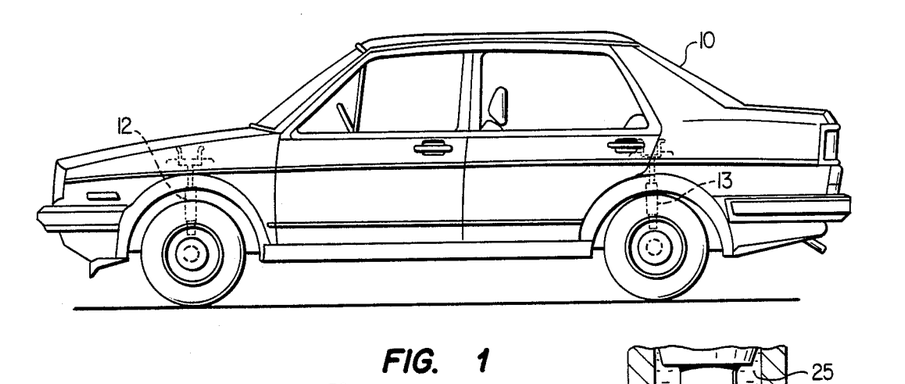
FIG. 1 is a side elevation of an automotive type vehicle utilizing the spring suspension system in accordance herewith.

Referring now to the drawings and in particular to FIG. 1, there is illustrated an automotive vehicle 10 in which the spring suspension struts in accordance with the invention are designated 12 and 13 as installed front and rear respectively. Such suspension struts can be supplied as original equipment by the manufacturer of auto 10 or can optionally be installed post manufacture as replacement equipment any time during the life of the auto.

Figure 2A:
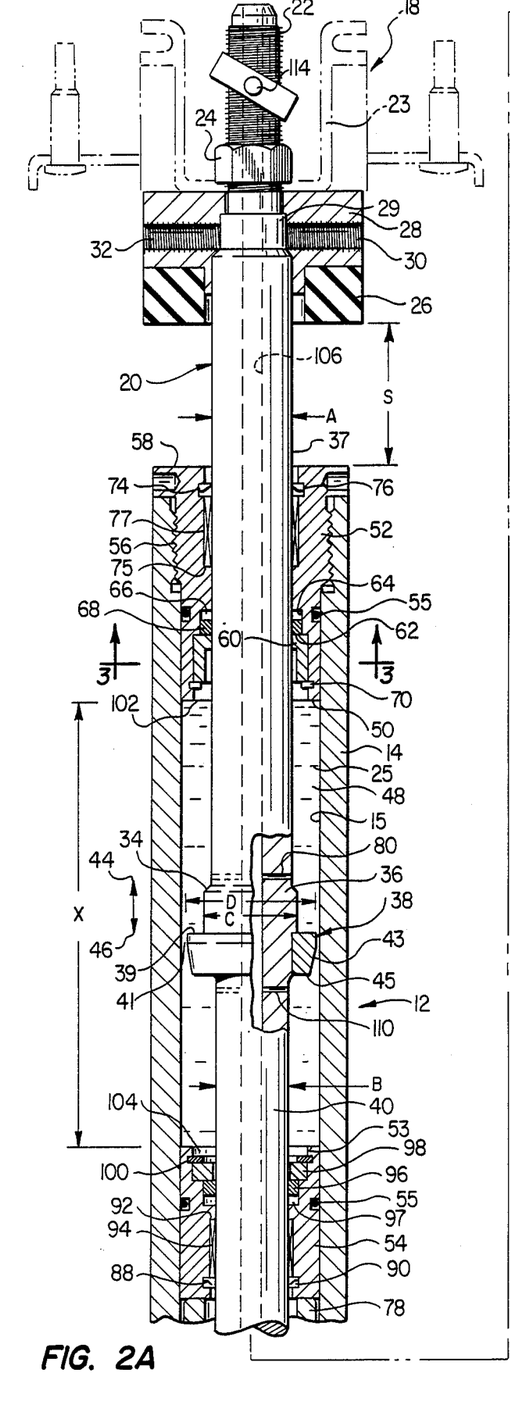
FIG. 2 is a sectional elevation of a front spring suspension strut of the type utilized in the automobile of FIG. 1.
Figure 2B:
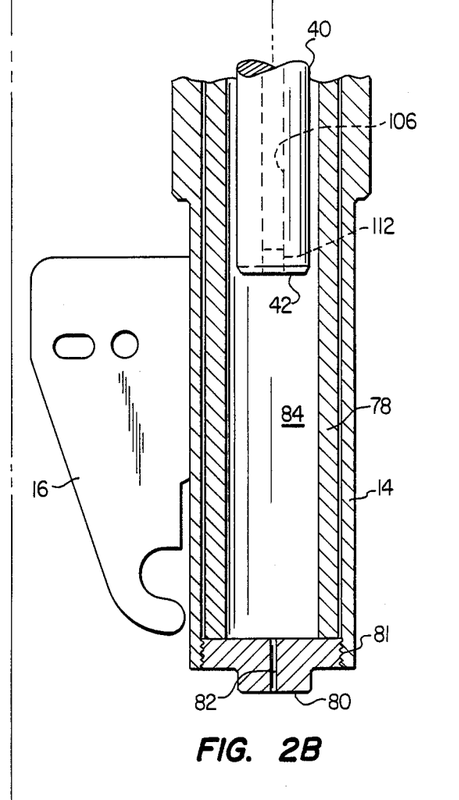
Figure 3:
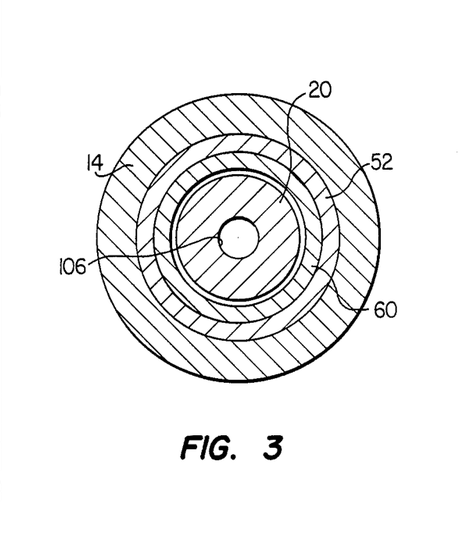
FIG. 3 is a sectional view taken substantially from the position 3—3 of FIG. 2.

Referring now to FIGS. 2 and 3, the suspension strut 12 (and 13 except for the modification of FIG. 7) in accordance herewith is comprised of an elongated tubular housing 14 on which a bracket 16 is secured for mounting onto the wheel support (not shown) of the vehicle 10. For securing the strut to the frame 18 of the vehicle elongated stepped diameter shaft/piston 20, as will be described more fully below, includes a shoulder 21 and a threaded end 22 extending through an aperture in frame channel 23. A lock nut 24 when tightened down secures the rod and suspension strut against the frame. Supported at the upper end of the rod is a resilient bounce pad 26 contained in a bounce retainer 28 in turn secured to neck 29 of the rod via opposing bolts 30 and 32.

Within housing 14 there is defined within the inside wall surface 15 a cavity 48 filled with a compressible silicon liquid 25 and a damper piston 38 integrally formed in shaft/piston 20. From the frame connection, the upper rod piston 37 of shaft/piston 20 extends inward of the housing to a chamfered shoulder 34 merging with a segment 36 of increased diameter about which damper piston 38 is coaxially formed. Similarly extending from the underside of piston 38 is a lower rod piston 40 formed as an integral extension of shaft/piston 20 and which terminates at a distal end 42.

In the course of travel by auto 10, the housing 14 will incur excursions by way of bounce in the direction of arrow 44 and rebound in the direction of arrow 46. The open volume surrounding piston 38 defines the divided cavity 48 filled with fluid 25 and which extends substantially between the exposed underface 50 of upper gland 52 and the exposed upper face 53 of bottom gland 54. Each of glands 52 and 54 are sealed to the housing 14 by resilient O-rings 55 with gland 52 being secured to the housing via threads 56.

Comprising upper gland 52 is the body portion threaded at 56 to the interior of housing 14 that terminates outward thereof in an annular flange 58. Secured in an annular recess on the underside of the gland 52 is an annular cup-like cushion 60 seated against a shoulder 62 which merges with a sleeve portion 64 so as to define a cavity 66 containing a compressed seal 68 for preventing loss of fluid from cavity 48. A retainer ring 70 secures cushion 60 in the recess while an annular wiper seal 74 contained in recess 76 at the opposite end provides a seal backup to any fluid leakage past seal 68. Supporting the housing for reciprocal displacement over shaft/piston 20 is a sleeve bearing 77 positioned against shoulder 75.

Lower gland 54, by contrast to the above, is supported on the upper end of a spacer sleeve 78 within housing 14 and has an open central bore 84. The lower end of sleeve 78 engages a plug 80 threaded into threads 81 at the underside of cylinder 14. Provided in plug 80 is a vent hole 82 by which air can enter and be discharged from the central bore 84 of sleeve 78 in the course of excursions being encountered by the strut. At the underside of gland 54 there is provided an annular wiper seal 88 contained in a recess 90. Contained between seal 88 and a shoulder 92 is a sleeve bearing 94 while above the sleeve bearing there is provided an annular compressed seal 96 maintained in place in a counterbore 97 by a spacer 98 in turn secured by means of a retainer ring 100.

In the foregoing arrangement, an annular space 102 at the underside of gland 52 provides a cushioning effect for the upper face 39 of piston 38 in the course of the rebound stroke whereas annular space 104 at the topside of gland 54 provides a cushioning effect for the underside 45 of piston 38 during the bounce stroke. Internally extending longitudinally continuous through shaft/piston 20 is a small diameter central bore 106 communicating with cavity 48 above piston 38 via a plurality of small diameter radial ports or apertures 108 and communicating with cavity 48 below piston 38 via a plurality of small diameter radial ports or apertures 110 for reasons as will be explained. At the distal end 42 of rod 40, bore 106 is sealed off via a threaded plug 112 while at its upper end, for reasons as will be understood bore 106 is adapted to be opened and closed by means of a valved pressure tap 114.

Figure 7:
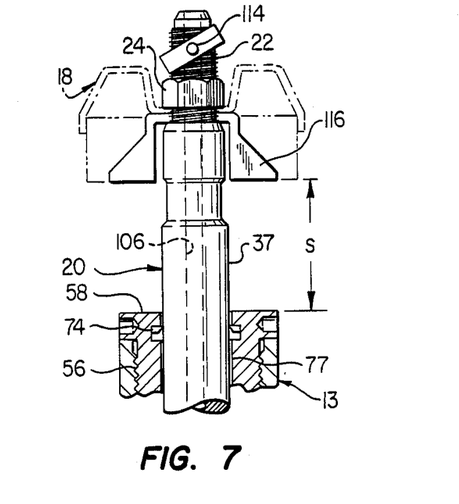
FIG. 7 is a fragmentary view similar to FIG. 2 of a rear spring suspension strut utilized in the automobile of FIG. 1.

The rear strut 13 as further illustrated in FIG. 7 is essentially similar in construction to the front strut 12 of FIG. 2 except for details of mounting and dimension of components for a slightly altered operation. As shown in FIG. 7, the mounting of upper rod piston 37 to the frame 18 of automobile 10 includes a rebound cone 116 positioned on the underside of frame 18 while the threaded end 22 is secured to the frame as before by a lock nut 24. Whereas the front strut 12 may have a stroke dimension S of approximately four inches, the comparable stroke S of rear strut 13 may be about five and three/eighths inches. Both front and rear struts 12 and 13 typically utilize a diametral dimension A of top rod piston 37 of about six to fifteen percent larger than the diametral dimension B of lower rod piston 40. For example, the finished diameter of upper rod piston 37 for both front and rear suspensions has been about 0.875 inches whereas the finished diameter of the lower rod piston 40 has been about 0.812 inches for both the front end rear suspensions. It will be understood in accordance with the construction hereof, that the shaft pistons 37 and 40 constitute pistons per se and are sized to support the vehicle load at the anticipated moments to be encountered. The shaft portions comprise the operative pistons such that the relative differential areas thereof are effective in creating the desired spring curve characteristics sought to be achieved.

Stepped segment 36 provides a still larger diametral dimension C sized to seat piston 38 and effect an exposed surface area on the top surface 39 of damper piston 38 contributing a controlled correlation with the exposed surface area of the undersurface 45 of piston 38. Segment 36, in this relation, functions as a hydraulic cushion by closing flow from the upper rebound chamber to the outer internal wall of cylinder 14. It also serves to afford protection of the main seals from peak rebound pressure.

Pursuant hereto, the diameter of damper piston 38 is selected so as to effect a predetermined annular orifice clearance 41 extending between the periphery of piston 38 and the inside diameter surface 15 of cylinder housing 14 for controlled damping as will be understood. The selected clearance 41 will depend on the specific application of the suspension system in which the struts are to be installed and for automotive use typically is about 0.030 to about 0.040 inches so as to provide damping coefficients of about 0.3 on bounce and about 0.5 on rebound. Such coefficients represent a percentage of critical damping required for a bounce cycle. Likewise damper piston 38 includes an inward taper 43 along its longitudinal dimension of about 10 degrees that terminates at the merger with underface 45. This enables easier flow from the bounce chamber to the rebound chamber while restricting flow from the rebound chamber so as to remove more energy on rebound. For purposes hereof, the underface 45 of piston 38 has about ten percent lesser surface area exposed to fluid in cavity 48 than does the upper surface 39 whereby resistance to displacement of cylinder 14 in the upward bounce stroke 44 is smaller than the resistance to displacement in the downward rebound stroke of the cylinder.

With the units assembled in the manner of FIGS. 2 and 7, a controlled quantity of compressible fluid 25 is introduced through pressure tap 114 and bore 106 into cavity 48 via the apertures 108 and 110. As fluid is being introduced, the static deflection curve for the strut after reaching an initial loading (zero deflection) is as generally shown by the volume curve A, of FIG. 8. For the initial zero deflection setting the damper piston 38 is placed in an intermediate position within cavity 48 for a corresponding static pressure load of the vehicle on which the strut is to be installed. The value of precharged pressure applied to the compressible fluid bears a direct correlation to the spring rate properties at which the strut is to be operative. For automotive uses the initial precharge would typically be on the order of 3000 psig to 4000 psig empty vehicle weight for operating at about 9000 psig loaded. For a 2-g bounce, this typically would increase to about 18,000–20,000 psig.

Operation of the struts 12 and 13 when installed on a vehicle is such that cylinder housing 14 will incur a bounce stroke 44 and a rebound stroke 46 in the course of auto travel. Limiting bounce 44 is the bounce pad 26 and the cushioning effect of cavity 104. Limiting the rebound 46 is the engagement of segment 36 and piston face 39 against the cushioning cavity 102. Damping, or flow of the compressed fluid 25 between the upper portion of the cavity 48 above piston 39 and the lower portion of the cavity below piston 38 during the course of excursion of housing 14 is controlled by the orifice dimension 41 and to a limited extent by the parallel flow afforded between the radial apertures 108 and 110 via the connective bore 106. Determining the spring rate at which the excursion can occur is correlated to the value of the precharge pressure applied initially to the fluid through pressure tap 114. It will be appreciated that with the diameter A of piston rod 37 being larger than the diameter B of piston rod 40, the relative volume of fluid in the upper rebound versus lower bounce portions of cavity 48 will be relatively less in the former than in the latter. Should a bottoming out be incurred on the bounce stroke, the face of housing topflange 58 will engage bounce pad 26 whereas damper piston surface 39 will encounter a controlled cushioning of fluid in cavity space 102 on the rebound stroke. Seeing that the entire suspension loading is carried by the shaft/piston 20, the need for the combination springs and shock absorbers in the manner of the prior art is eliminated. Not only is the suspension therefore achieved with a single integral unit, but the spring like properties can be factory preset to any desired suspension characteristics sought to be maintained. Characteristically, the greater the differential dynamic pressure between cavity chambers the faster and greater is the highly desirable damping effect.

Figure 4:
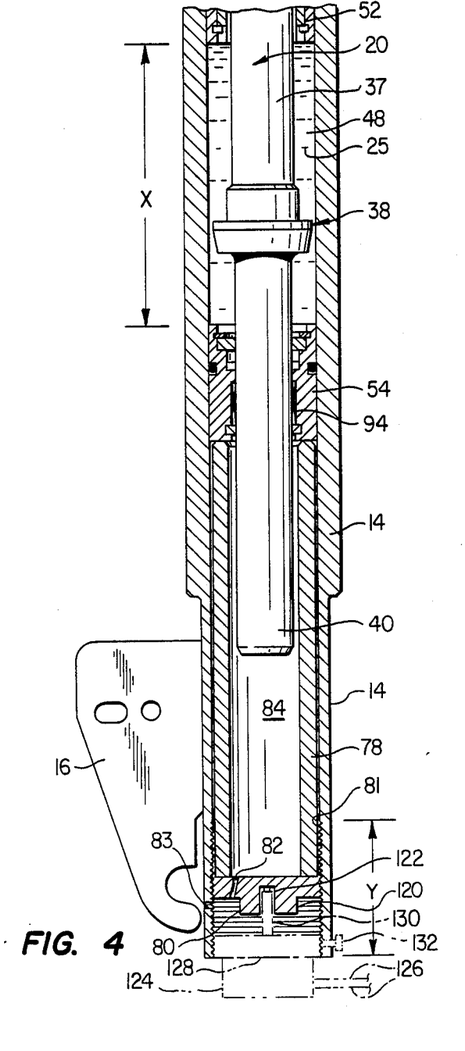
FIG. 4 is a fragmentary view similar to FIG. 2 illustrating a first adjustment modification in accordance with the invention.

For an understanding of the structure enabling post-assembly adjustment of the fluid spring rate in cavity 48, reference is made to FIGS. 4–6, 8 and 9. As shown in FIG. 4, the under end of cylinder 14 is internally threaded at 81 for a dimension Y in which to receive plug 80. The location of the plug shown solid is such that the internal spacer sleeve 78 will position lower gland 54 relative to upper gland 52 so as to define a static load cavity length dimension X preset by the factory. Plug 80 includes a hex head 120 for receipt of a socket wrench whereby the plug 80 can be threadedly advanced relatively inward or outward over the provided length Y of thread 118. Advancing the plug inwardly causes a corresponding inward displacement of sleeve 78 as lower gland 54 is moved upward. This reduces the cavity length X by a longitudinal dimension corresponding to the displacement of sleeve 78 while the volume of cavity 48 is reduced in correspondence thereto so as to impose a greater precharge pressure on the same fluid quantity previously supplied. Conversely, when displacing plug 80 downward cavity dimension X and cavity volume are increased so as to reduce the precharge pressure applied to the fluid quantity previously supplied to cavity 48.

Figure 5:
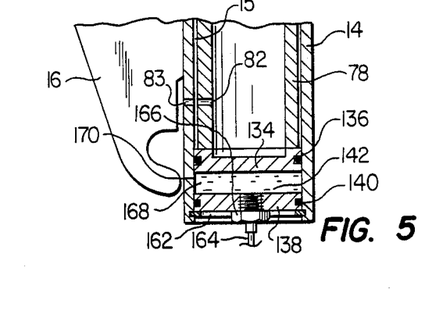
FIG. 5 is a fragmentary view similar to FIG. 2 illustrating a second adjustment modification in accordance with invention.

To optionally effect the foregoing adjustment via a power drive rather than manually, sleeve 78 can be displaced electrically as illustrated in phantom in FIG. 4 or hydraulically as illustrated in FIG. 5. For the power drive version of FIG. 4, plug 80 is modified to include a hexagonal recess 122 in the underside of hex head 120. An electric motor 124 having leads 126 is secured in threads 81 at the under end of sleeve 14 by means of a threaded collar 128 supported about the motor housing. Rotatably driven by motor 124 when energized is an elongated hexagonal drive shaft 130 extending inward of recess 122 in a drive connection therewith. As shaft 130 is caused to rotate, plug 80 will be rotated concomitantly for threaded advancement up or down as appropriate. A lock screw 132 secures the position of collar 128.

For the optional hydraulic drive embodiment of FIG. 5, the underface of spacer sleeve 78 is engaged by a piston 134 slidably sealed against wall surface 15 by a resilient O-ring seal 136. Received in cylinder 14 spaced and below piston 134 is a pressure plate 138 sealed thereat via O-ring seal 140 and having a central threaded aperture 142. A retainer ring 162 secures pressure plate 138 in position. Secured in aperture 142 and joined to hydraulic conduit 164 is a conduit connector 166. By means of hydraulic fluid 168 supplied or withdrawn to or from chamber 170 relative to a reservoir (not shown), spacer sleeve 78 can be caused to be displaced as above.

Figure 8:
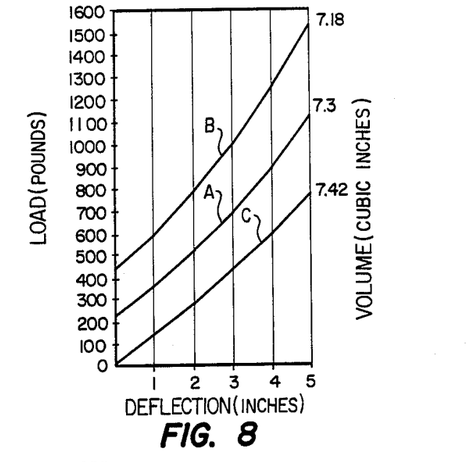
FIG. 8 is a load versus deflection curve derived from the suspension strut hereof supported on the front suspension of a 1986 Ford Escort.
Figure 9:
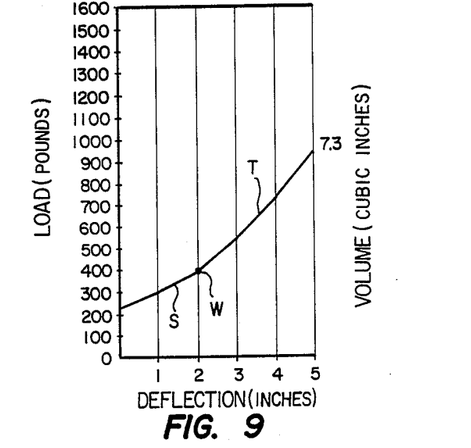
FIG. 9 is a load versus deflection curve for the modification of FIG. 6.

The effect of precharge pressure on the spring rate of the fluid and consequent strut deflection can be appreciated with reference to the curves of FIG. 8. With curve A of FIG. 8 representing the normal factory pre-setting for a cavity volume of 7.3 cubic inches, increasing the vehicle load from 215 lbs. empty to about 700 lbs. will produce a strut deflection of about 3.2 inches. Increasing the internal pressure of fluid 25 by decreasing the volume to 7.18 cubic inches in the manner of FIGS. 4 or 5 results in changed operating characteristics as represented by curve B. Under those conditions, the strut will not produce any deflection until a load of about 440 pounds is incurred and at 700 lbs. will produce a reduced deflection of only about 1.6 inches. Conversely, increasing the cavity volume to 7.42 cubic inches as represented by curve C result in a deflection of about 1.4 inches at a 200 lb. and a 4.7 inch deflection at a 700 lb. loading. As established thereby, changing the spring rate of the fluid by altering the precharge pressure via changes in cavity volume has the effect of shifting the deflection curves in relation to the magnitude of precharge pressure being applied. Obviously the greater the deflection per unit force the softer the ride and the lesser deflection the firmer the ride.

Figure 6:
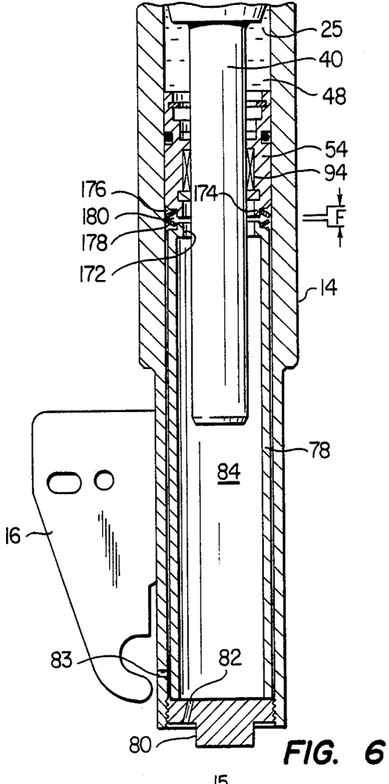
FIG. 6 is a fragmentary view similar to FIG. 2 illustrating a third adjustment modification in accordance with the invention.

For the embodiment of FIG. 6, the upper end of spacer sleeve 78 is necked down to a reduced diameter tubular flange 172 axially spaced a distance F from a corresponding flange 174 downwardly depending from the underface of gland 54. Contained within the annular spacing 176 thereat encircling the flange is a pair of Belleville springs 178 and 180.

In this arrangement, increased loading from the empty zero deflection load will first cause springs 178 and 180 to be compressed toward each other. Concomitantly with compression of the springs, gland 54 is caused to be displaced away from gland 52 and which displacement can continue until the end faces of flanges 172 and 174 engage each other. The effect thereof is to expand the active volume of cavity 48 to the longitudinal limit provided by spacing F such that until spring compression is stopped, volume increases with pressure. This is represented by the relatively shallow initial slope of curve portion S in FIG. 9 to the point W. Beyond that point, additional loading will assume a relatively steeper slope as represented by curve portion T resulting, by the combination of curve portions S and T, in a dual spring rate from empty vs. full load.

Figure 10:
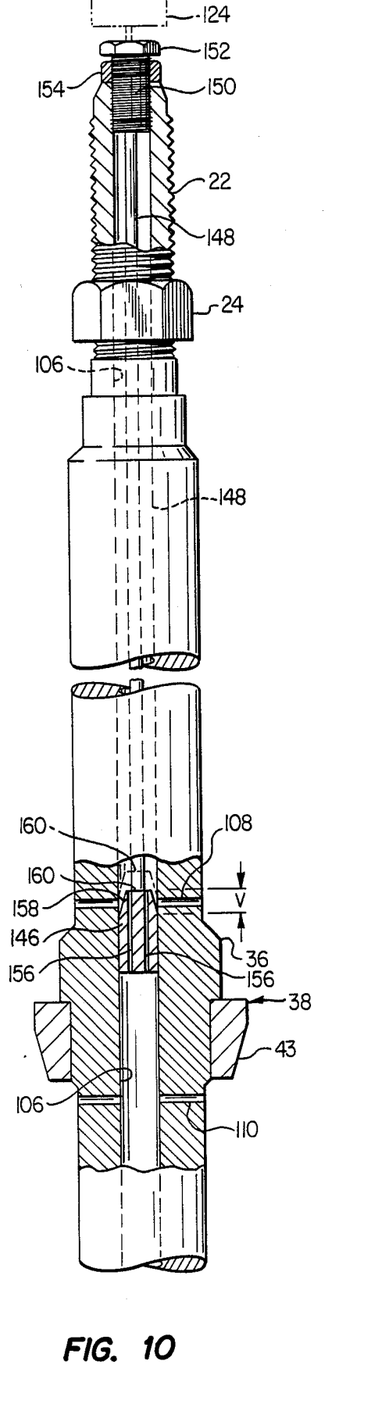
FIG. 10 is an enlarged view for an optional modification in the suspension strut of FIG. 2 to enable adjustment of damping characteristics.

To vary the damping rate when desired, there are provided the optional features of construction exemplified by FIG. 10. For those purposes, an elongated plug 146 is slidably disposed within vertical bore 106 to within the vicinity of piston 38. Supporting the plug, and to which the plug is connected, is an upstanding rod 148 of diameter less than that of bore 106 to permit fluid flow thereabout. The upper distal end of rod 148 is enlarged and threaded at 150 to form an adjustable threaded connection with end 22 of shaft/piston 20. For adjustment purposes a hex head 152 is provided while lock nut 154 secures the longitudinal position setting of the rod and plug 146.

To effect damping, plug 146 includes a plurality of small diameter longitudinal bores 156 that communicate fluid flow in the position illustrated from above and below the plug via ports 108 and 110. Also included about the upper end of plug 146 is an annular frustoconical taper 158 extending for a dimension V from the full plug diameter to a reduced diameter at upper end face 160. In the relation illustrated solid, near maximum damping flow is effected between apertures 108 and 110. By adjustably displacing rod 148 upwardly to place plug 146 at the phantom location, ports 108 become increasingly blocked so as to reduce the damping flow to and from ports 110. While it is contemplated that hex head 152 will be adjusted manually, either the electrically driven features of motor 124 of FIG. 4 or the hydraulic adjustment features of FIG. 5 could be readily adapted thereto.

By the above description there is disclosed novel fluid suspension strut apparatus for a vehicle suspension system. Not only does the strut hereof replace the previous combination of shock absorber and spring for controlling the ride properties of the vehicle, but it affords the versatility of enabling the spring rate and/or the damping of the suspension system to be adjusted individually on site at each wheel. By means of the individual adjustment features, the ride and load properties of the suspension system can be custom matched to any preferential standard for the vehicle during the useful life of the suspension system. Utilizing a unique construction of a double ended piston in combination with a displaceable housing mounted about the piston ends in a fluid sealed relation, there is provided means for controllably varying the volume of the fluid cavity whereby the spring rate imposed upon the confined fluid can be readily increased or decreased as required to achieve the desired riding properties. Providing both the shaft support and the sealed relation are two spaced apart glands comprising an upper gland and a lower gland each of which include a sleeve bearing for supporting the stepped shaft/piston rods for relative reciprocal displacement of the cylinder thereon. At the same time, the series positioned seals afford a fluid tight seal against leakage of the pressurized compressible fluid from the cavity area. For effecting spring rate adjustment, one or both of the individual glands are susceptible of being displaced relatively toward or away from the opposite gland so as to alter the volume of the intervening fluid cavity. This is achieved via a mechanical adjustment operable either manually or powered and accessible from beneath the vehicle. Optionally, the adjustment can be self effected by means of a construction contained within the cylinder and affording a dual spring rate from empty to full load. The effect of adjustment is to change the cavity volume whereby the quantity of contained fluid is increasingly or decreasingly compressed for altering the spring rate of the fluid. The result thereof is to change the deflection properties of the suspension system as controlled by the suspension strut. While described principally in terms of mechanical structures, obviously more automatic systems could be utilized involving electrical or pneumatic drives with or without clutching, etc.

An annular orifice clearance about the piston between the circumference of the piston and the internal diameter of the cylinder thereat enables a controlled damping rate as excursions of the cylinder are incurred in the course of use. Further modulation of the damping can be achieved by means of an optional adjustment feature disposed within a bypass extending internally about the damper piston. By having a controlled differential in diameter on the upper and lower portions, a controlled variance between the bounce and rebound of the strut can be factory preset in an optimizing relationship. Notwithstanding, vehicle operators are no longer required to tolerate the original equipment suspension system characteristics as preadjusted by the manufacturer but are now by virtue hereof able themselves to vary the ride properties without the necessity of replacing the suspension components in the manner of the prior art. Being that the spring rate affects the suspension characteristics more directly than damping changes, the system lends itself to programming via simple computer systems. The latter could include for example a constant ride height system with dynamic characteristics, variable dependent on the excursion strokes. While the invention has been described in its preferred embodiment as intended for vehicle suspension, it should be readily apparent that it can be utilized elsewhere on a variety of apparatus wherever shock elimination is required or desirable.

Since many changes could be made in the above construction and many apparently widely different embodiments of this invention could be made without departing from the scope thereof, it is intended that all matter contained in the drawings and specification shall be interpreted as illustrative and not in a limiting sense.

I claim:

1. In combination with a vehicle having a chassis and a wheel, a spring support and damping device for interconnecting the wheel and the chassis comprising:
   a fluid cylinder means having opposite first and second ends including first and second rod load bearing means and first and second seal means, respectively,
   piston rod means disposed in the fluid cylinder having first and second rod portions extending through and reciprocally disposed in the first and second bearing means and first and second seal means respectively to define a pressure chamber for fluid,
   the piston rod including damping piston means dividing the cylinder and thereby the pressure chamber into a bounce chamber formed between the cylinder, the damping piston, the rod means and the first seal means and a rebound chamber formed between the cylinder, the damping piston means, the rod means and the second seal means,
   the diameters of the second rod piston and second seal means being greater than the diameter of the first rod portion and first seal means to provide a volume within the cylinder which is decreased as the second rod end is reciprocated into the cylinder and increased as the second rod end is reciprocated out of the cylinder, a compressible liquid filling the pressure chamber defined by the cylinder means, rod means and the first and second seal means around the rod means, the liquid being at a static pressure sufficient to force the second rod means out of the cylinder to support the vehicle with the piston means positioned at a desired level within the cylinder, means controlling the flow of liquid between the bounce chamber and the rebound chamber during reciprocation of the rod means to provide dynamic damping of the reciprocating motion of the rod means relative to the cylinder means as the vehicle traverses uneven terrain, and first coupling means for attaching the wheel to one of the piston rod means or the cylinder means and second coupling means for connecting the chassis to the other of said piston rod means or cylinder means.

2. The combination of claim 1 for a vehicle having a chassis and wheel spindle pivotally connected by stabilizing linkage means to the chassis, wherein, the second coupling means pivotally connects the rod means to the vehicle chassis, and the first coupling means connects the cylinder means to the vehicle wheel support means such that a major portion of the torsional loads applied to the wheel are carried by the spaced first and second load bearing means carried by the first and second ends of the cylinder means and disposed around the rod means.

3. The combination of claim 2 wherein the wheel spindle is connected to the cylinder means which is also rotatable about the rod means to provide stearing for the vehicle.

4. The combination of claim 2 wherein:

the rod means includes fluid passageway means providing fluid communication from the exterior to the interior of the cylinder means, and means controlling the passage of fluid through the passageway for selectively changing the quantity of liquid in the pressure chamber to thereby change the pressure in the chamber and thus the spring rate and static level of the rod means relative to the cylinder means for a given load.

5. The combination of claim 2 further comprising:

means for selectively changing the effective total fluid volume of the fluid in communication with the bounce and rebound chambers to change the fluid pressure and thus the spring rate and the static level of the rod means relative to the cylinder means for a given load.

6. The combination of claim 5 wherein:

the means for selectively changing the effective total volume comprises a cylindrical fluid subchamber in fluid communication with the pressure chamber, and means reciprocally positioned within the cylindrical subchamber for selectively varying the volume of the subchamber and thus the total volume of the pressure chamber.

7. The combination of claim 6 further comprising electrically driven means for driving the means reciprocally positioned within the cylindrical subchamber.

8. The combination of claim 6 further comprising hydraulic means for driving the means reciprocally positioned within the cylindrical subchamber.

9. The combination of claim 6 wherein:

the subchamber is formed coaxial with one end of the cylinder means and the means reciprocally positioned therein comprises the end wall of the cylinder including the respective bearing means and seal means.

10. The combination of claim 9 further comprising means responsive to a rotary mechanical input for positioning the end wall of the cylinder.

11. The combination of claim 9 further comprising means responsive to a hydraulic fluid force to position the end wall of the cylinder.

12. The combination of claim 1 wherein the periphery of the damping piston provides controlled fluid flow between the bounce and rebound chambers at least sufficient to provide dynamic damping.

13. The combination of claim 12 wherein the piston rod means includes a third fluid chamber extending at least from the outer end of the second rod to the bounce chamber side of the damping piston, and bounce orifice means providing restricted fluid flow between the bounce chamber and the central fluid chamber.

14. The combination of claim 13 further comprising means for selectively altering the restriction to fluid flow through at least one of the orifice means from outside the cylinder means and piston means.

15. The combination of claim 14 wherein the means for selectively altering the restriction to fluid flow comprises means positioned in a central bore of the rod means and extending to a point accessible from the second rod end of the rod means.

16. The combination of claim 13 wherein the third fluid chamber has a volume sufficient to significantly increase the static spring rate of the suspension device.

17. The combination of claim 12 wherein the periphery of the damping piston is spaced from the cylinder wall to minimize friction and cost of manufacture.

18. The combination of claim 17 wherein the periphery of the damping piston has first and second circular faces each extending radially to peripheral edges into close proximity with the cylinder wall, one of the peripheral edges being spaced slightly further from the cylinder wall than the other to provide an asymetrical fluid flow path between the piston and the cylinder wall whereby fluid will flow more easily in the direction one to thereby provide differential dynamic damping.

19. The combination of claim 1 wherein the rod means forms a rod chamber containing a substantial volume of fluid which is in fluid communication with at least one of the bounce or rebound chambers to provide an increased fluid volume and thereby a reduced spring rate.

20. The combination of claim 19 wherein the rod chamber is in fluid communication with at least one of the bounce or rebound chamber through a restrictive flow orifice to provide dynamic damping.

21. The combination of claim 20 wherein the rod chamber is in fluid communication with both the bounce and rebound chambers through separate restrictive flow orifices.

22. The combination of claim 1 further comprising:

fluid passageway means extending through at least one of the first or second rod portions providing restricted fluid flow from one of the chambers to the other of the chambers, the point of communication of the fluid passageway with the respective chamber being spaced from the piston means by a limited distance, peripheral means on the respective first or second cylinder end spaced from the respective seal means and forming a limited annular clearance with the respective rod portion such that as the point of communication of the passageway means passes the peripheral means the flow of fluid from the chamber will be significantly restricted and the maximum pressure acting on the adjacent seal means will be substantially reduced as compared to the pressure in the chamber as the piston means continues to move toward the cylinder end to provide a fluid cushion for retarding travel of the piston toward the cylinder end without subjecting the seal means to the corresponding higher pressure.

23. The combination of claim 22 wherein the limited annular clearance and point of entry are associated with the second end and second rod portion to protect the second seal in the event of an extreme rebound stroke.

24. A liquid spring cylinder device having a piston reciprocally disposed in a cylinder and connected to a piston rod extending through an end wall of the cylinder which carries a peripheral seal means slidably disposed about the rod, the piston and rod dividing the cylinder into a high pressure chamber and a lower pressure chamber in which the pressure progressively increases as the piston approaches the cylinder end wall, fluid passageway means extending through the rod providing restricted fluid flow from the high pressure chamber to the lower pressure chamber, the point of communication of the fluid passageway with the high pressure chamber being spaced from the piston means, peripheral means on the cylinder end spaced inwardly from the seal means and forming a limited annular clearance with the respective rod portion such that as the point of communication of the passageway means passes the peripheral means the flow of fluid from the high pressure chamber will be significantly restricted and the maximum pressure acting on the seal means will be substantially reduced as compared to the pressure in the high pressure chamber as the piston means continues to move toward the cylinder end to provide a fluid cushion for retarding travel of the piston toward the cylinder end without subjecting the seal means to the corresponding higher pressure.

* * * * *

UNITED STATES PATENT AND TRADEMARK OFFICE
CERTIFICATE OF CORRECTION

PATENT NO. : 4,741,516
DATED : May 3, 1988
INVENTOR(S) : Leo W. Davis

It is certified that error appears in the above-identified patent and that said Letters Patent is hereby corrected as shown below:

Col. 3, line 40, "." should be --,--.

Col. 12, line 48, between "direction" and "one" insert from the one face to the other than from the other to the --.

Signed and Sealed this

Twenty-fifth Day of October, 1988

*Attest:*

DONALD J. QUIGG

*Attesting Officer*  *Commissioner of Patents and Trademarks*